United States Patent [19]
Kiser

[11] 3,920,140
[45] Nov. 18, 1975

[54] INSULATED CONTAINER
[76] Inventor: Cecil M. Kiser, 128 N. Main, Newkirk, Okla. 74647
[22] Filed: Apr. 29, 1974
[21] Appl. No.: 465,267

[52] U.S. Cl............. 215/100 R; 224/32 R; 248/359
[51] Int. Cl.² ......................................... B65D 25/22
[58] Field of Search............ 215/100 R, 100 A, 1 C; 248/359, 360; 222/180, 181; 224/5 W, 32 R, 35, 36, 30 R

[56] References Cited
UNITED STATES PATENTS
1,762,331  6/1930  Greist............................. 215/100 R
2,406,696  8/1946  Leslie....................... 215/100 A UX
3,190,500  6/1965  Miles.............................. 248/359 X
3,578,549  5/1971  Cleereman...................... 215/1 C X Primary Examiner—Donald F. Norton
Attorney, Agent, or Firm—John H. Widdowson

[57] ABSTRACT

An insulated container for carrying liquids is mounted on a bar-like member or other supporting structure. The container has an aperture in an upper portion thereof and a clip for removably mounting it on a bar-like member or other supporting structure. The container is smaller in cross-section in its upper end portion, and one of its sidewalls is inclined in an upper end portion to in use provide clearance for normal operation of a vehicle or the like.

3 Claims, 5 Drawing Figures

1
INSULATED CONTAINER

CROSS-REFERENCE TO RELATED APPLICATION

Attention is directed to my currently pending application entitled INSULATED CONTAINER, filed Sept. 24, 1973, having Ser. No. 400,322.

BACKGROUND OF THE INVENTION

The invention is related to insulated containers for liquids where the container structure is removably mountable on a supporting structure. Numerous containers are known in the prior art which can be used for the transportation of liquids on vehicles such as bicycles, motor bikes, and the like; however, such containers are not specifically constructed for this purpose and their use requires that a bracket or clamp to be secured to the vehicle to mount the bottle or container on the vehicle. Generally, the prior art containers carried on bicycles or the like in brackets are merely non-insulated plastic bottles that are removably mounted in a bracket or clamp that is secured to the vehicle. These prior art containers and mounts are generally bulky and therefore they must be mounted on the vehicle at some point substantially removed from the steering mechanism and the rider because they will interfere with turning the steering mechanism and they can interfere with movement of the rider in operating the vehicle. Prior art devices cannot be suspended on the handlebars of a motorcycle or the like because they can hit the gasoline tank or other forward structure and interfere with turning. Prior art devices cannot be suspended on the handlebars of a bicycle because they can interfere with the upper portion of the rider's leg as he operates the pedals and they can also interfere with turning. No insulated container other than the structure specifically disclosed in my presently above-identified pending application for patent is known which is adapted for use on bicycles, motorcycles, and other vehicles for the transportation of liquids.

SUMMARY OF THE INVENTION

In preferred specific embodiments an insulated container structure is provided which has insulated sidewalls, top, and bottom and a clip mount for attaching same to a bar-like member or other supporting structures. An aperture in the top of the container serves as an inlet and an outlet and it is closable by a cap. An arm extends from a portion of one sidewall along the sidewall for in use gripping a bar-like member between the arm and the sidewall for mounting the container. The container can be formed from a single piece of plastic material with the wall thereof having imperforate portions on the interior of the container and on the exterior of the container and with the center portion of the wall being of a foamic composition. The container is shaped so that it can be conveniently carried on the upper portion of the crash bars of a motorcycle in a position so that it will not interfere with the steering mechanism or other mechanical functions of the motorcycle. It can be carried on essentially any bar-like member such as a bicycle frame or handlebars or it can be carried on other supporting structures such as a person's belt.

One object of this invention is to provide an insulated container overcoming the aforementioned disadvantages of the prior art devices.

2

Another object of this invention is to provide an insulated container structure having a clip-like mount for easy mounting of the container with a bar-like member such as on the handlebars or frame of a bicycle, motor bike, or motorcycle, or on any other supporting structure on which the mount can be attached.

Still another object of this invention is to provide an insulated container structure formed of a single piece of plastic material and having a clip mount integrally formed therewith wherein the clip mount has an arm member for engaging a member of a supporting structure between the arm member and a portion of a sidewall of the container.

Yet, another object of this invention is to provide an insulated container having a closable aperture on an upper portion thereof and a container that is mountable on a vehicle, such as a motorcycle in a position where it will not interfere with operation of the motorcycle, and which can be used for the purpose of carrying liquids for refreshment purposes.

Yet, one other object of this invention is to provide an insulated container which has an integrally formed clip mount and a necked aperture for an inlet and outlet, wherein the container is constructed of a single piece of plastic material and it is constructed in a manner to provide an imperforate inner wall portion on the interior of the container and an imperforate outer wall portion on the exterior of the container and to have a foamic composition interior wall portion between the interior and exterior walls of the container.

Various other objects, advantages and features of the invention will become apparent to those skilled in the art from the following discussion, taken in conjunction with the accompanying drawings.

Figure 1:
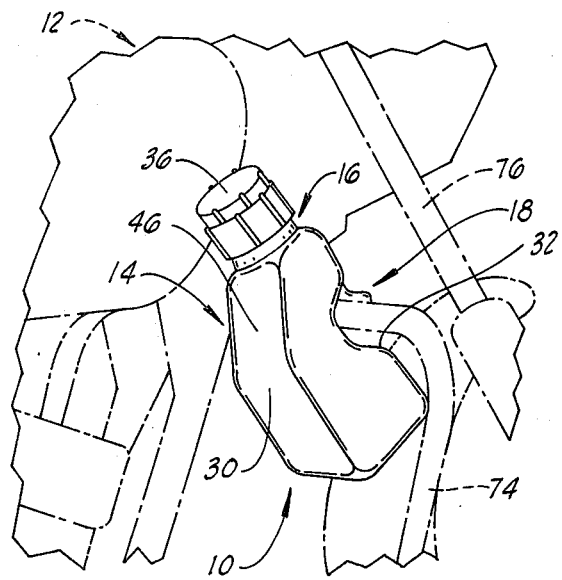
FIG. 1 is a fragmentary perspective view of a portion of a motorcycle having the container mounted on the upper portion of the crash bar.
Figure 4:
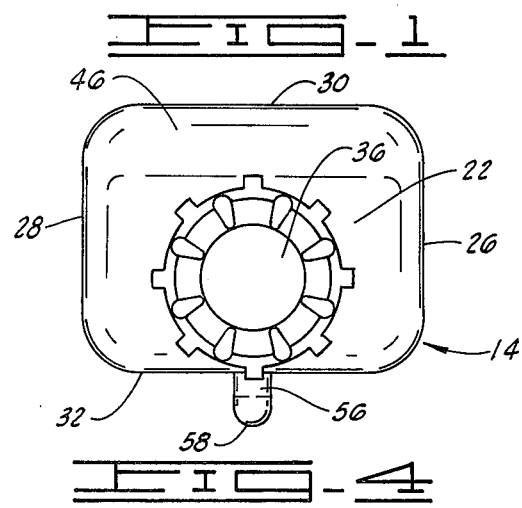
FIG. 4 is a top view of the container.

The following is a discussion and description of preferred specific embodiments of the insulated container structure of this invention, such being made with reference to the drawing, whereupon the same reference numerals are used to indicate the same or similar parts and/or structures. It is to be understood that this discussion and description is not to unduly limit the scope of the invention.

DESCRIPTION OF SPECIFIC EMBODIMENTS

Referring to the drawing in detail and in particular to FIG. 1, it illustrates the insulated container of this invention, indicated generally at 10, mounted on a motorcycle, indicated generally at 12. The insulated container structure 10 of this invention generally includes a tank-like portion 14 forming the liquid reservoir or container having a necked aperture 16 to serve as the inlet and outlet for the container and further including a clip mount 18 for mounting the container 10 on a supporting structure. The clip mount 18 is constructed for mounting the container on a bar-like member for storage and support in carrying or transporting the container 10. The clip mount 18 is constructed so it can be mounted on virtually any appropriately sized bar-like member, or any other structure which can be grasped and retained by the arm of the clip mount 18. The insulated structure of the container 10 is a result of its unique preferred one-piece construction. The sidewalls, top, and bottom of the tank-like portion 14 and necked aperture 16 of the container as well as the clip mount 18 are constructed by a technique molding plastic materials whereby a single piece of plastic material is used to form a resultant product which has insulated walls that are imperforate on the exterior and the interior of the structure and which have a foamic or multicellular structure in the center portion of the walls thereof.

FIGS. 1-4 show in detail the external structural features of the insulated container 10 of this invention. The tank-like portion 14 of the container 10 is constructed with top 22, a bottom 24, and sidewalls 26, 28, 30 and 32, joining the top 22 and bottom 24 on opposite sides, the front, and the rear, respectively. In the following discussion of the structure of the insulated container 10, the front side of the container will be referred to as the side indicated at 30 as it is the side of the container which would normally be facing the user when the insulated container is mounted with a supporting structure as illustrated in FIG. 1. The necked aperture 16 which functions as the inlet and outlet for the cavity of the container is in the top 32 and includes a neck 34 extending substantially from the top 22. A cap 36 is threadedly mounted on the outer end portion of the neck 34 and is used for sealing or closing the opening of the neck. The specific cap 36 shown in the drawing has an extended side portion extending from the threaded portion thereof so that when the cap is removed from the insulated container 10 it can be used as a drinking cup. A resilient washer or seal member 40 is fitted in the end of the cap 36 as shown in FIG. 5 to seal the end of the neck and the cap to prevent leakage.

The tank-like portion 14 of the insulated container structure 10 is preferably constructed in the shape shown in the drawing because in practice it has been found to be a convenient shape; however, it is to be understood that the insulated container 10 can be formed in shapes other than that shown in the drawing without departing from the scope of the invention. The container sidewalls 26 and 28 are essentially parallel and similarly shaped with sidewall 28 being shown in FIG. 2. Sidewall 30, the front side of the structure, has the lower portion thereof indicated at 44 and being substantially perpendicular to the plane of the sidewalls 26 and 28 and the plane of the bottom 24, it also has an upper portion 46 inclined relative to the plane of the bottom 24 and joining the upper portion of the lower sidewall portion 44 with the top 22. The rear sidewall 32 has a lower portion 48 parallel to the lower front sidewall portion 44, a recessed portion in the center portion thereof forming part of the clip mount 18, and an upper sidewall portion indicated at 50 essentially parallel to the rear lower sidewall portion 48. The recessed portion of the rear sidewall 32 has an inclined portion 52 and an arcuate portion 54 preferably shaped as shown in the drawing. The arcuate portion 54 of the recessed portion of sidewall 32 is preferably generally semi-circularly shaped so that in use of the insulated container 10 the clip mount 18 will accept a substantially circularly shaped bar-like member.

Figure 5:
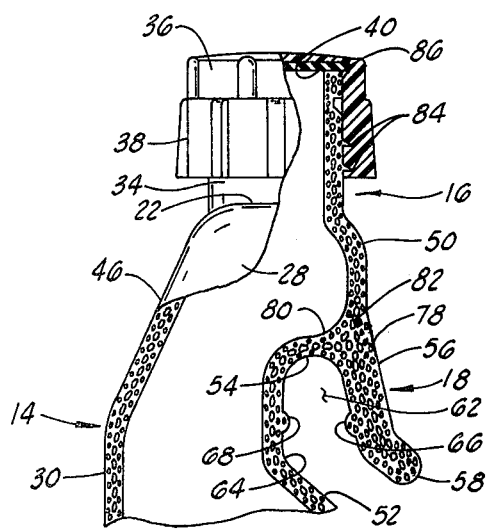
FIG. 5 is a cut away view of the upper portion of the container showing the construction of the container wall and the cap in detail.
Figure 2:
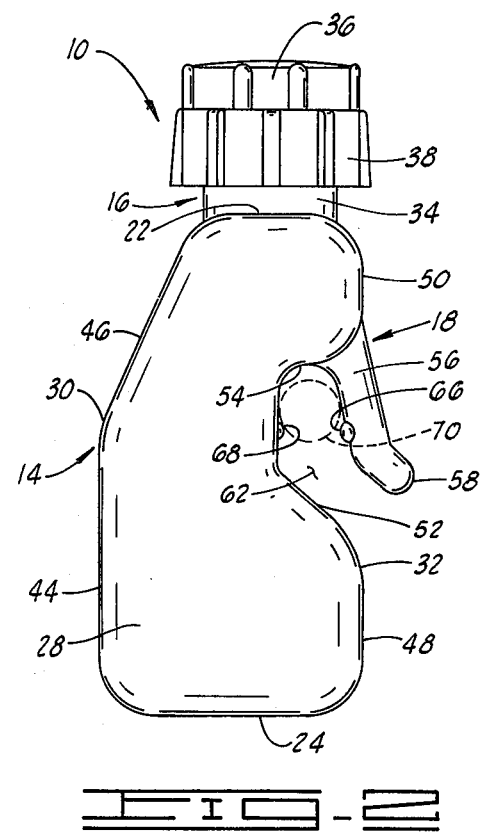
FIG. 2 is a side elevation view of one side of the container.
Figure 3:
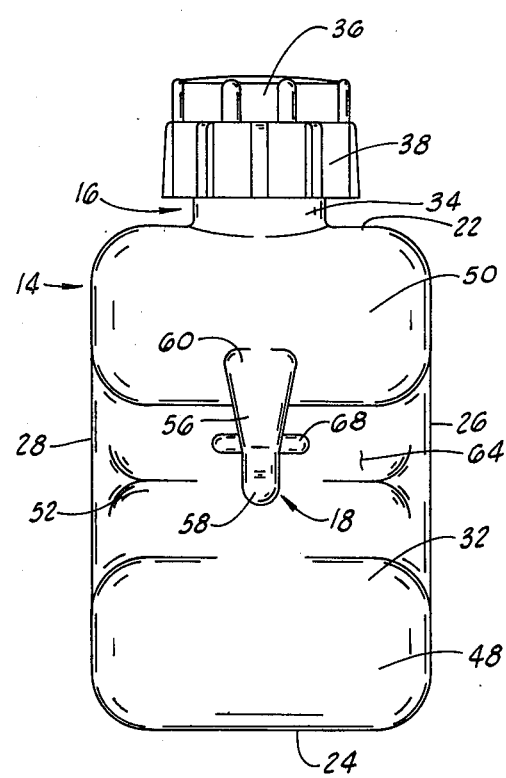
FIG. 3 is a side elevation view of the container, taken from the side having the clip mount.

The clip mount 18 is shown in detail in FIGS. 2, 3, and 5. The clip mount 18 has an arm member 56 extending from the upper portion 50 of the container sidewall 32 and extending alongside a portion of the sidewall, specifically over the recessed portion of the sidewall. The arm member 56 has an outwardly turned end portion 58 on the lower end thereof which is spaced from the inclined sidewall portion 52 so that a bar-like member can be passed between the arm member 56 and the wall portions of the recessed container sidewall portion. Preferably, the arm member 56 is shaped as shown in the drawing with the upper end portion thereof indicated at 60 being substantially wider than the lower outwardly turned end portion 58 for strengthening the arm member. A slot-like passageway indicated generally at 62 is formed between the arm member 56 and the most recessed sidewall portion 64. A protrusion indicated at 66 extends from the arm member 56 inward into the slot-like passageway 62 and another protrusion 68 on the sidewall portion 64 extends inwardly into the slot-like passageway 62 as shown clearly in FIGS. 2 and 5. In use the clip mount 18 will receive a bar-like member in the slot-like aperture in the portion between the arcuate portion 54 and the protrusions 66 and 68. A generally cross-sectionally cylindrically shaped bar-like member is shown in dashed lines and indicated at 70 in FIG. 2. As the bar-like member 70 is moved to the position shown through the slot-like passageway 62, arm member 56 will flex or bend and move outward relative to the body of the container's tank portion 14 to allow the bar-like member 70 to pass between the protrusions 66 and 68. When the insulated container 10 is removed from a bar-like member or a supporting structure, the arm 56 will again flex or bend to permit the bar-like member to slip between the protrusions 66 and 68.

The specific shape of the exterior of the insulated container 10 can obviously be varied from that shown in the drawing so the container can be shaped for a specific need if desired. The clip mount 18 can obviously be constructed with relative dimensions other than indicated in the drawing so it can receive supporting members other than the generally cylindrically cross-sectioned bar-like member 70 shown in FIG. 2. It is to be noted that the relative size of the clip mount 18 must be sufficient to support the insulated container 10 and its contents when it is full of liquid, and this will of course depend upon the capacity of the container and the weight of its contents. Preferably, the volumetric capacity of the insulated container is in the range of 1 to 2 quarts where it is to be used for carrying liquid refreshments on bicycles, motorcycles, and the like.

In regard to the preferred shape of the exterior of the insulated container as shown in the drawing, it is specifically designed for use with a motorcycle or bicycle. FIG. 1 shows the insulated container 10 mounted on the crash bar 74 of a motorcycle 12. The insulated container 10 is shown hanging in the position it would normally assume when filled with a liquid. In this position the front sidewall 30 is rearwardly directed or facing the rider and the inclined portion thereof indicated at 46 is essentially upright. The rear sidewall of the container indicated at 32 faces forward on the motorcycle and is in a plane generally parallel with the plane of the steering forks of the steering mechanism one of which is indicated at 76. The sidewall portion 46 being generally upright is positioned so that it will not interfere with the normal position of the rider. Specifically, it will not bump against the knee of the rider. The angular orientation of the sidewall 32 generally aligns with the fork portion of the steering mechanism thus it will not interfere with turning of the front wheel by the steering mechanism. It is to be noted that the insulated container 10 should for safety reasons be placed on the rear of the crash bar 74 as shown so that body of the container will be positioned clearly out of the way of the steering mechanism. FIG. 1 illustrates the insulated container 10 mounted on the crash bar structure of a motorcycle; however, it is to be understood that the insulated container can be mounted on the handlebar structure of the motorcycle or any other structural members of the motorcycle on which clip mount 18 can be attached. When the insulated container 10 is mounted on the handlebar or steering fork structure of a motorcycle or the like the tapered shape of the container becomes an important feature because its shape is such that it will not restrict or hamper movement of the steering assembly. Mounting the insulated container 10 on the fork assembly or handlebars of a motorcycle with the sidewall 30 facing the rider will position the inclined sidewall portion 46 adjacent to the gasoline tank when the steering assembly is turned in one direction. The shape of the insulated container 10 as shown is such that it will not interfere with turning the motorcycle because the inclined sidewall portion 46 avoids contact with the nonmovable portions of the motorcycle.

When the insulated container 10 is mounted on the handlebar structure of a bicycle, it would preferably be positioned as shown with the forward sidewall 30 facing the rider and mounted near the center of the handlebars. When the insulated container 10 is mounted on a bicycle in the described position, the inclined sidewall portion 46 would function similarly to provide clearance for the rider while operating the bicycle. It is to be noted that with the insulated container 10 in this position it is possible for the rider to remove the cap 36 and rotate the insulated container 10 on the handlebar structure to a position where liquid can be poured from the container so the rider may drink while riding. it is to be emphasized that the insulated container 10 can be used on vehicles other than motorcycles and bicycles, for example, it can be carried on agricultural machinery, in automobiles, on snowmobiles, etc., and additionally it can be carried on a person's body by attaching the clip mount 18 over a belt, strap or other structure which will support the insulated container.

In the construction of the insulated container 10 of this invention, it is preferably formed by a blow molding process from a single piece of thermoplastic material with the cap 36 formed separately and added to the structure after it is molded.

FIG. 5 shows in cross-sectional view portions of the insulated container 10 which illustrate the structure of the walls thereof when the container is formed by the preferred process. The wall structure has an outer wall portion 78, an inner wall portion 80 and a center wall portion 82. The outer wall portion 78 and the inner wall portion 80 include the exterior surface of the wall and the portions thereof immediately adjacent to the surface. They are formed of small relatively densely packed cells in a closed cell configuration. The center portion of the wall indicated at 82 is a less dense cellular structure having relatively considerably larger cells than the other wall portions 78 and 80. In the drawing the surfaces of the container walls are shown by straight lines for clarity; however, in practice these surfaces may be slightly bumpy or rough to the touch due to the cellular structure of the material from which the container is constructed. The wall structure as shown and produced in practice is impervious to liquids normally used for refreshment purposes, such as water, ice tea, hot coffee, etc. The clip mount 18 is formed substantially as an extended portion of the container wall as shown. The neck aperture or inlet and outlet portion of the container is integrally formed with the walls thereof with the neck 34 extending from the container top 22. The neck 34 has threads 84 molded in the exterior thereof on its outer end portion with the end of the neck indicated at 86 and being flat and essentially planar for engaging the sealing gasket 40 in the cap 36 to seal the container. The cap 36 and neck structure 34 can be modified from that illustrated in the drawing without significantly departing from the scope of the invention; for example, a snap-on type cap can be used or the aperture can be constructed directly in the top 22 and the aperture sealing member can be a plug.

In the blow molding of expanded plastics special blowing agents are used to affect the cellular structure of the plastic material. With the use of special blowing agents in a plastic material a plastic article can be formed using a thermoplastic material which has a foamic or open cellular body on the interior portions of the article while the exterior portions of the article have a more dense, smooth and closed cell appearance. Articles formed in this process have better thermal, acoustical and electrical insulation properties as well as improved mechanical damping properties than do articles formed without the special blowing agents. In practice bottles with the described structural characteristics have been produced using a high melting point polymer such as linear polyethylene as the basic material and introducing cellogen AZ and/or OT as the blowing agent or foaming agent with the bottles being formed in a conventional plastic forming blow molding machine. In such practice the polymer and blowing agent were products of the Uniroyal Corporation with the polymer being high density (0.95) polyethylene, wherein the polymer in pellet form is tumbled mixed with the blowing agent(s) and coloring pigments prior to heating and molding. It is to be noted that the use of cellogen in articles used for handling food products and the like is regulated in its percentage content in the articles by the U.S. Federal Food and Drug Administration. The U.S. Federal Food and Drug Administration presently approves the use of cellogen AZ up to 2 percent by volume and the use of cellogen OT up to ½ percent by volume and in the above practice producing the described bottles, the percentages were not exceeded. Although the above practice was carried out using products of the Uniroyal Corporation, it is anticipated the linear polyethylene sold under the trademark 55-80, a product of the Phillips Petroleum Company, Bartlesville, Okla. can be used to produce similar results. In practice in constructing the insulated container 10 shown in the drawing, it has been produced by the described blow molding technique using the described components. In practice the insulated container of this invention has been constructed as described above with the plastic material colored to enhance its appearance and with an ultraviolet stabilizer added to the material of construction prior to molding. In practice the ultraviolet stabilizer identified as UV 531, a product of the American Cyanamide Company, has been found to prevent deterioration of the colored plastic in sunlight. In practice the insulated container 10 has been covered in bright fluorescent colors such as orange and green, which makes the insulated container extremely easily visible and highly reflective thereby enhancing the safety of a bicycle or motorcycle when the insulated container is mounted therewith. The insulated container 10 has also been produced in the colors of black and avacado.

The insulated container 10 of this invention can be constructed by methods other than that described and produce a similar article without departing from the scope of the invention. One alternate construction for the insulated container is by using injection molding techniques well known in the prior art wherein the inner wall portion of the insulated container and the outer wall portion of the insulated container are molded as separate structures, then the outer wall portion is severed into two or more pieces and fitted over the inner wall portion, then the unit is placed in an injection molding machine and the space between the inner wall portion and the outer wall portion is filled with a foamic insulating material which joins the separate parts into a single unit. In this construction the inner wall portion and the outer wall portion can be constructed by a blow molding technique and constructed from the previously identified high melting point polymer and have the identified coloring pigments if desired. When the outer wall portion of the container is cut or separated, it should necessarily be separated along a predetermined line or lines so that when the container is assembled and the space between the walls is filled with the foamic plastic insulation material, it will retain the portions of the structure together. If desired a suitable bonding agent can be applied to the outer wall along the seam or seams thereof to secure the separate parts of the outer wall portions together.

In the manufacture of the insulated container structure of this invention, it is obvious that the container can be easily constructed by injection and blow molding techniques well known in the art to achieve the end product. In the manufacture of the container the materials preferably used are the identified polymers and other elements which are well known in the art and frequently used for containers and other articles. In the manufacturing process using the preferred blow molding technique and the special foaming agents the manufacturing of the container can be accomplished in a single molding operation with the cap being molded in another separate operation.

In the use of the insulated container structure of this invention, it is seen that same provides a thermal insulated container for the storage and transportation of heated or cooled liquids for refreshment purposes. The container structure is easily mountable with a supporting structure such as a bar-like member on a bicycle, motor bike, or other vehicle so the container can be carried for refreshment purposes of the rider or operator of the vehicle. The container can be carried by a strap, belt, or the like on a person's body or mounted on any other suitable supporting structure. The insulated container is provided with a cap on the inlet and outlet aperture thereof which can be removed and used for a drinking cup by filling it when it is removed. The container is constructed with insulating properties which will enable it to store heated or cooled liquids for a significant period of time such as when a person is operating a bicycle, motor bike, motorcycle, or other vehicle for recreational purposes or when carrying the container while hiking or the like.

As will become apparent from the foregoing description of the applicant's insulated container structure, relatively inexpensive and structurally simple means have been provided for the construction of an insulated container structure which is removably mountable with a bar-like member or other supporting structure for the transportation of liquids for refreshment purposes. The insulated container structure is economical to produce, simple to use, attractive in appearance and may be repeatedly refilled as necessary. The insulated container is provided with a clip mount which makes it easily attachable to and removable from a supporting structure such as a bar-like member at the desire of the user.

While the invention has been described in conjunction with preferred specific embodiments thereof, it will be understood that this description is intended to illustrate and not to limit the scope of the invention which is defined by the following claims.

I claim:

1. An insulated container and mount therefor, comprising:
    a. a container for liquids having a top, a bottom, and sidewalls, said top, bottom, said sidewalls having means insulating said container,
    b. said container having an aperture in an upper portion thereof,
    c. said container having a flexible arm member integrally formed with one of said sidewalls and extending from the sidewall,
    d. said container being small in cross-section in its upper end portion and having one of said sidewalls inclined inwardly and upwardly in an upper end portion, and
    e. a pair of opposite protrusions, one on said arm member and the other on a sidewall adjacent thereto, said protrusions being spaced to in use grip and position a bar-like member between said protrusions and the juncture of said sidewall and said arm member, said container being constructed and adapted to be used for carrying and storing a liquid with said container being mountable on a bar-like member or supporting structure portion of a vehicle or the like with said inclined upper sidewall being positionable when mounted to provide clearance for normal operation of said vehicle or the like.

2. The insulated container of claim 1, wherein:
    a. said container has said aperture in said top, and
    b. said flexible arm member is opposite said inclined sidewall portion.

3. The insulated container of claim 2, wherein:
    a. said arm member is in an upper portion of said container,
    b. said sidewall adjacent to said arm member has a recessed portion with said protrusion therein, and
    c. said aperture has a threaded neck portion extending from said top to receive and removably mount a cap member.

* * * * *